Figure 1:
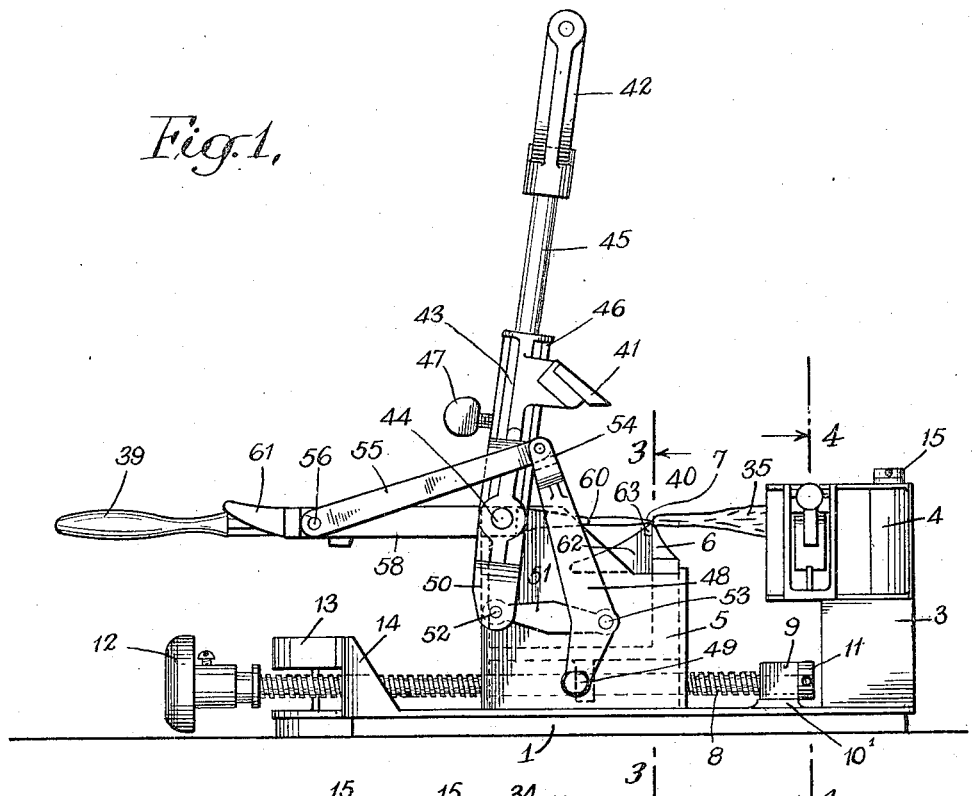

B. V. EDWARDS.
OYSTER SHUCKING MACHINE.
APPLICATION FILED OCT. 17, 1916.

1,212,464.

Patented Jan. 16, 1917.
2 SHEETS—SHEET 1.

INVENTOR.
Bruce V. Edwards
BY
J. C. Edmonds
ATTORNEY

B. V. EDWARDS.
OYSTER SHUCKING MACHINE.
APPLICATION FILED OCT. 17, 1916.

1,212,464.

Patented Jan. 16, 1917.
2 SHEETS—SHEET 2.

INVENTOR.
Bruce V. Edwards
BY
ATTORNEY.

UNITED STATES PATENT OFFICE.

BRUCE V. EDWARDS, OF NEWARK, NEW JERSEY, ASSIGNOR TO OLIVER S. CAMPBELL, OF NEW YORK, N. Y.

OYSTER-SHUCKING MACHINE.

1,212,464.   Specification of Letters Patent.   Patented Jan. 16, 1917.

Application filed October 17, 1916. Serial No. 126,120.

*To all whom it may concern:*

Be it known that I, BRUCE V. EDWARDS, a citizen of the United States, residing at Newark, in the county of Essex and State of New Jersey, have invented certain new and useful Improvements in Oyster-Shucking Machines, of which the following is a specification.

My invention relates to an apparatus devised to open and shuck oysters under the various conditions which arise on account of the varying shapes and sizes of oysters. Oysters are ordinarily opened by expert hand operators and poor results are obtained when any one except a highly skilled workman attempts the operation.

My invention provides means whereby the services of comparatively unskilled persons, such as servants in private families, may be utilized with an effectiveness and rapidity at least as great as that achieved by the most skilled hand operatives and with a greater degree of cleanliness.

In properly opening an oyster which is to be served on the half-shell, it is necessary that the eye of the oyster, that is, the muscle connecting together the two shells, be severed and that the knife should pass between the body of the oyster and the upper shell, without cutting the oyster itself. The upper shells of oysters vary in an irregular manner in their curvature and conformation, the end of the shell opposite from the hinge sometimes curving to the right and sometimes to the left, the curvature upwardly and downwardly also being very irregular. Accordingly, I have provided an apparatus wherein oysters of various sizes and shapes may be quickly clamped, the extreme tip of the shell protruding from the clamp clipped off and a cutting and wedging knife entered into the opening thus made and caused to follow the curvature of the upper shell, this to be effective under the various conditions which will be encountered. Accordingly, I have provided a device wherein the anvil against which the projecting end of the oyster abuts is movable toward and away from the clamp and also laterally on an arc about the jaws of the clamp as a center, so that the anvil may be readily alined at right angles to the path which should be taken by the opening knife, it being understood that the knife should pass through the eye of the oyster to sever the same. The knife referred to is so mounted as to be movable forwardly across the anvil after the ends of the shells have been clipped, the knife being movable forwardly under lever control and so mounted and balanced that its forward end may readily be guided upwardly or downwardly to follow the curvature of the under side of the upper shell. After the eye of the oyster has been severed, the wedge action of the knife serves to swing the upper shell upwardly and forwardly about the hinge of the oyster, the upper shell falling forwardly away from the oyster at the end of the movement. The oyster, together with all of its juice, will be left upon the lower shell in the clamping device and may be quickly removed therefrom.

In order that a clearer understanding of my invention may be had, attention is hereby directed to the accompanying drawings forming part of this application and illustrating one embodiment of my invention.

Figure 2:
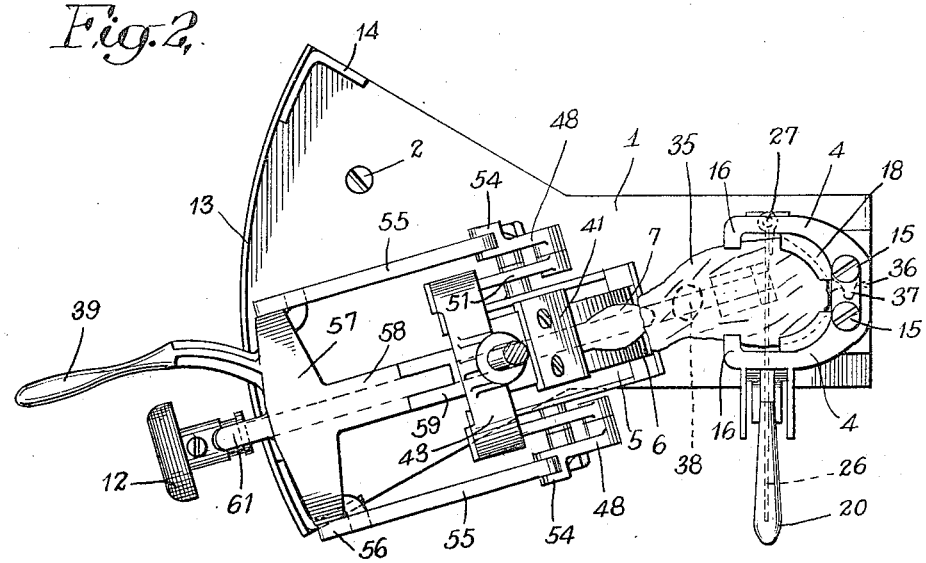
Figure 3:
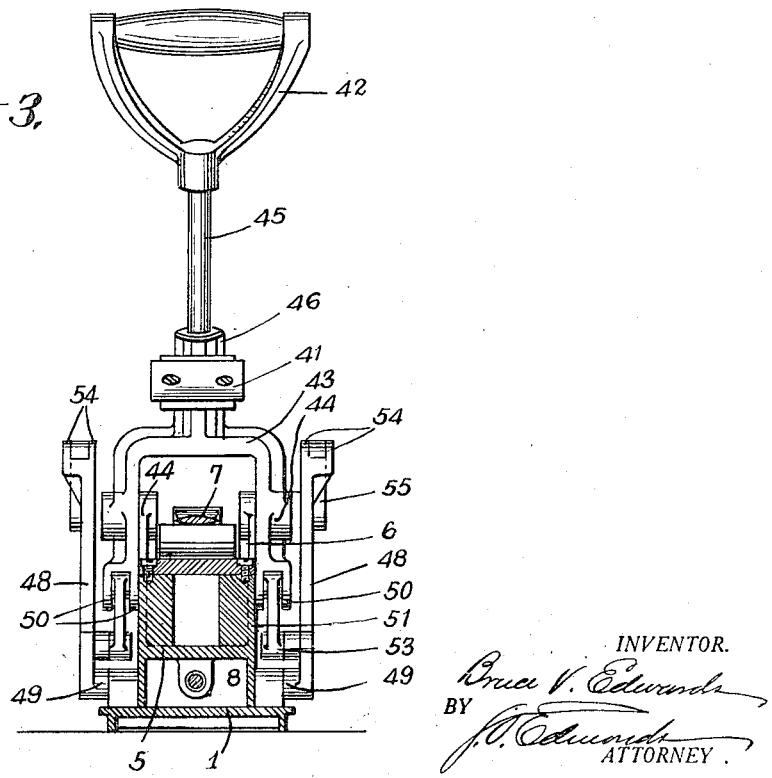

In the drawings Figure 1 represents a side elevation of the device with the point of the opening knife just entering the opening between the shells of the oyster. Fig. 2 is a top plan view of the same and Figs. 3 and 4 are enlarged vertical cross-sections taken respectively on lines 3—3 and 4—4 of Fig. 1.

Referring to the drawings, a main frame 1 is provided comprising preferably a casting or metallic bed-plate which may be secured by screws 2 to a suitable table or support. An upwardly extending support 3 integral with or secured to the bed-plate 1 at one end of the same serves as a support for the clamping jaws 4, 4.

A carriage 5 serves as a support for the anvil and lower cutting edge 6 and also for the opening knife 7. Carriage 5 is mounted for movement upon the lead-screw 8 of coarse pitch, one end of which extends through a block 9, which is integral with a vertical pivot pin 10, rotatively mounted in base plate 1, block 9 resting on a lug 10′ formed on the upper surface of base plate 1. The screw 8 has a collar 11 secured on the end of the same between the pivoted block 9 and the standard 3, the screw being movable with block 9 in an arc about the vertical axis of pin 10 as a center, the screw also being rotatable about its own axis within block 9, but immovable lengthwise with respect to block 9. The carriage 5 slides over the surface of base plate 1 either in an arc about the axis of block 9 as a center, or longitudinally of the screw 8, when the latter is rotated. The screw preferably extends beyond the curved rear edge of base plate 1 and is provided at its outer or rear end with a knob 12 for rotating the screw. A curved rear guide rail 13 is preferably provided to extend transversely above the rear portion of the screw, this rail being secured to lugs 14 extending upwardly from the two rear corners of the base plate.

Various forms of clamping device may be utilized for holding the oyster in position, but that which I will now describe is deemed preferable by me. The clamping jaws, 4, 4 are mounted for oscillation about the vertical pins 15, 15 which are located rather closely together at the forward end of the support 3. The jaws 4 are provided at their rear ends with inwardly extending flanges 16, 16 which are provided with inner serrated surfaces 17. The clamping surfaces 17 are inclined upwardly and outwardly, as will be seen from Fig. 4, so that the lower ends of the same will be closer together than the upper ends, the result of which will be that the lower shell of the oyster may be firmly clamped, while the upper shell is left free to be swung upwardly and forwardly. The inner surfaces of the jaws 4, forwardly from the clamping faces 17, are also provided with upper and lower inwardly directed flanges 18, 18 and 19, 19. The lower flanges 19 are adapted to support the forward or hinged end of the oyster and are inclined upwardly from their rear ends to their forward ends, considering the end at which the clamping jaws are pivoted as the forward end of the machine. The upper flanges 18 slant downwardly from their rear to their forward ends and extend inwardly from the surfaces of the jaws a considerably less distance than do the bottom supporting flanges 19.

One of the clamping jaws 4 is provided with an operating handle 20 which is pivoted at 21 to a lateral extension 22 from the jaw 4. A pawl 23 is pivoted on a horizontal pin 24 to a member 25 integral with handle 20 and extending downwardly from the pivot 21 of the handle. This pawl is adapted to coact with a ratchet 26 which at its opposite end is pivoted on a vertical pin 27 mounted in the opposite jaw 4. Ratchet 26 extends through an opening 28 in the right hand jaw 4, referring to Fig. 4, and is adapted to slide on the horizontal surface 29 of the lateral extension 22. Pawl 23 is adapted to oscillate about its pivot 24 between the inclined downwardly extending projections 30 and 31 of member 25, which as stated, is movable with handle 20. Pawl 23 is provided at its forward or lower end with a pair of downwardly extending pins 32, one of which is adapted to extend on each side of ratchet 26 for the purpose of preventing ratchet 26 moving out from under pawl 23 when the jaws 4 are oscillated. The enlarged head portion of handle 20 is also provided with an upwardly extending pin 33 adapted to coact with the outwardly extending stop lug 34 of the adjacent jaw 4 to prevent excessive upward movement of handle 20.

To operate the clamping device an oyster in its shell, such as is indicated at 35, is placed between the clamping jaws 4 with its hinged end resting on the flanges 19, the jaws being in a sufficiently opened position. Handle 20 is then raised to lift pawl 23 out of contact with ratchet 26 and the handle pressed inwardly to bring the clamping surfaces 17 into contact with the opposite edges of the lower shell, the oyster being held in an approximately horizontal position. The jaw 4 on the opposite side of the machine swings inwardly and outwardly, when the jaw carrying handle 20 moves inwardly and outwardly, because of the coaction of a curved lug 36 on one of the jaws 4 adjacent to the pivot 15 thereof, with a pair of curved lugs 37 formed adjacent to the pivot of the other jaw 4, the lug 36 rolling between lugs 37 as the handle 20 is pressed inwardly or pulled outwardly. The clamping surfaces 17 having been quickly brought into contact with the opposite edges of the shell, as stated, handle 20 is dropped to bring pawl 23 into coaction with ratchet 26. Raising and lowering handle 20 several times will now serve to clamp the surfaces 17 tightly against the edges of the shell, pawl 23 swinging from contact with stop lug 30 into contact with stop lug 31 as the handle is depressed and forcing the ratchet 26 outwardly the distance of one tooth each operation.

In the adjustment of the device, carriage 5, together with lead-screw 8 on which it is mounted, are now swung about the vertical pin 10 as a center in order to position the anvil 6 substantially at right angles to the path which the opening knife 7 should take in opening the oyster. This is necessary because, as stated above, the extended end of the oyster, or "bill" through which the knife must pass sometimes curves to the left in a horizontal plane, referring to Fig. 2, sometimes to the right and sometimes extends in an approximately straight line from the opposite or hinged end of the oyster. In order that the eye of the oyster, indicated in Fig. 2 at 38, should be severed, it is necessary that the axis of knife 7 should be in substantial alinement with an imaginary line extending forwardly from the bill of the oyster through the eye. Accordingly, anvil 6 should be positioned approximately at right angles to this line. This oscillatory adjustment having been made, by manipulation either of the knob 12 or the handle 39, the knob 12 is given a partial rotation to advance anvil 6 into contact with the bill of the oyster, the extreme tips of the upper and lower shells resting upon the cutting surface 40 at the top of the anvil. The upper blade or knife edge 41 is now oscillated downwardly, by means of handle 42, to coact with cutting edge 40, to shear off the extreme points of the shells to make an opening through which knife 7 may be advanced. Cutter 41 is secured to a bifurcated frame 43, which is pivoted as shown at 44, 44 to the opposite sides of carriage 5. Handle 42 has a stem 45 which may be removably secured in the upwardly extending sleeve portion 46 of pivoted frame 43, by means of the thumb-screw 47.

The manner in which the opening knife 7 is preferably mounted will now be described. A pair of bent levers 48 are employed, one on each side of carriage 5, these levers being pivoted at their lower ends, as shown at 49. The arms of the bifurcated frame 43 extend downwardly below their pivots 44 and are provided with bifurcated lower ends 50. A short link 51 on each side of carriage 5 is pivotally connected at one of its ends, as shown at 52, between the bifurcated ends of the arms of pivoted frame 43. The opposite or forward ends of links 51 are pivoted, as is shown at 53, to the inner sides of bent levers 48. The bent levers 48 extend upwardly and rearwardly from pivots 53, in the position of the parts shown in the drawings, the upper and rear ends of each lever 48 being provided with a bifurcated end 54, levers 48 extending on the outer sides of pivoted frame 43.

A pair of links 55 are used, one on each side of the machine extending from a pivotal connection with lever 48 between the forked ends 54 thereof to a pivotal connection 56 at the rear end of each link 55 with the frame 57 extending horizontally between the rear ends of the two links 55, as is shown in Fig. 2.

Guiding handle 39 previously referred to extends rearwardly from frame member 57. Frame 57 has a forwardly extending portion 58 parallel to and centrally located between links 55. Opening knife 7 is carried by this forwardly extending member 58 as an axial extension thereof. Preferably knife 7 is secured to extension 58 with a mortise and tenon joint, as shown at 59. As is shown in Fig. 1, knife 7 has a cutting edge at its forward end and rearwardly from the cutting edge it gradually increases in thickness, as shown at 60, to form a wedge surface.

Frame member 57 may be provided with a rearwardly extending curved lug 61 which is adapted to ride over the rail 13 and knob 12 when the device is allowed to move into its inoperative position. Means may also be provided to prevent the point of knife 7 contacting against the rear surface of anvil 6 when the knife is moved forwardly to open an oyster. Such means may comprise a member 62 secured to or integral with the rear surface of anvil 6 and having an upwardly and forwardly sloping upper surface to guide knife 7 over the top of anvil 6 in the forward movement of the knife. Member 62, if provided, should have an opening 63 in the top surface thereof immediately behind knife edge 40 of anvil 6 to receive the blade 41 when the latter coacts with blade 40 in clipping the rearwardly extending points of the oyster shells.

It is believed that the operation will now be entirely clear. The oyster having been clamped between jaws 4 and carriage 5 adjusted, both axially of screw 8 and circularly about pivot 10, if these adjustments are found necessary, the extreme rearward tip or bill of the upper and lower shells will rest upon cutting edge 40. The operator now grasps handle 39 in one hand and handle 42 with the other and swings handle 42 forwardly and downwardly to snip off the tip of the shell. Handle 42 is now raised, the point of knife 7 riding up the incline of guide 62 until the extreme point of the knife enters the opening between the upper and lower shells immediately above edge 40. The operator now continues to swing handle 42 rearwardly while at the same time he manipulates handle 39 to cause the point of knife 7 to remain in close contact with the under side of the upper shell as the knife advances.

In the forward movement of knife 7 described, the forward portion of the knife slides over edge 40 of the anvil and is supported thereby. Edge 40 thus acting as a fulcrum, the inclination of the knife may be varied at will by raising or lowering handle 39. In the opening movement described, considerable leverage and a multiplying motion for advancing the knife are obtained by means of the link and lever connections extending between handle 42 and knife 7, comprising pivoted frame 43, links 51, bent levers 48, links 55 and the frame 58 from which the knife extends. The pivotal connection of links 55 with frame 57 and bent levers 48 permit the inclination of the rear end of frame 57, 58 to be varied absolutely under the control of the hand grasping handle 39, as stated, so that the point of knife 7 is readily caused to follow the up and down curvature of the under side of the top shell of the oyster.

In the advance of knife 7, the eye 38 or muscle joining the upper and lower shells is entirely severed, after which the thickened or wedge-shaped portion of the knife causes the upper shell to swing forwardly and rearwardly about the hinge of the oyster. It will be noted that this motion of the upper shell is rendered possible by the fact that the clamping surfaces 17 slant upwardly and outwardly, so that the upper shell of the oyster is not held by the same. Also the upper flanges 18 extending inwardly from the clamping jaws 4 extend inwardly an insufficient distance to interfere with the pivotal movement of the upper shell. These upper flanges 18 are desirable to form an abutment for the forward portion of the oyster to prevent raising of the latter when a vertical turning leverage is exerted by the downward pressure of knife edge 41 in shearing off the bill of the oyster preparatory to opening the oyster.

At the completion of the forward movement of knife 7, the upper shell lifts and may swing over the vertical center and fall over the front end of the clamping device, leaving the oyster uninjured with its contained juices in the lower shell. The oyster is then quickly removed, the clamp being released by raising handle 20 and pulling the latter outwardly when the next oyster is placed in position and the operation repeated. A speed at least equal to that of the best hand operators may be acquired with very little practice in the manipulation of the machine.

It should be understood that my invention is not limited strictly to the exact details of construction described, but is as broad as is indicated by the accompanying claims.

What I claim is:—

1. In oyster shucking apparatus, the combination of an oyster-holding device, from which the end of the oyster opposite to the hinge is adapted to extend rearwardly, a carriage mounted to the rear of said device, an opening knife carried by said carriage, positioning means for said carriage, adapted to move said carriage to aline the axis of said knife with a line passing from the bill of an oyster held in said holding device, through the eye thereof regardless of the shape of the oyster, and means for advancing said knife rearwardly to open the oyster, substantially as set forth.

2. In oyster shucking apparatus, the combination of an oyster-holding device, a carriage, shearing devices carried thereby for cutting off the bill of the oyster, a knife carried by the carriage in alinement with the opening thus made, means for adjusting the position of the carriage, and lever means for operating the shearing devices and advancing said knife, substantially as set forth.

3. In oyster shucking apparatus, the combination of an oyster-holding device, a carriage, a guiding edge thereon, a knife, the forward portion of which is adapted to slide over said edge in entering the oyster, a hand lever pivoted on said carriage, an operating connection between said lever and the rear portion of said knife, arranged to permit free vertical movement to said rear portion as said knife advances over said edge, and means for adjusting the position of said carriage, substantially as set forth.

4. In oyster shucking apparatus, the combination of a support having an anvil, a hand lever pivoted on said support, an opening knife adapted to slide over said anvil, and an operating connection between said lever and the rear portion of said knife, arranged to reciprocate said knife as said lever is operated, and to permit free vertical movement to said rear portion under manual control during the reciprocation of the knife, substantially as set forth.

5. In oyster shucking apparatus, the combination of a support, having a guiding edge thereon, a knife, the forward portion of which is adapted to slide over said edge, a hand lever pivoted on said support, a cross member extending from the rear of said knife, and a multiplying pivoted link and lever connection between said hand lever and cross member, arranged to permit free vertical movement to the rear portion of said knife, substantially as set forth.

6. In oyster shucking apparatus, the combination of an oyster-holding clamp, a support, hand lever means pivoted to said support, a knife adapted to move toward and away from said clamp, operative connections between said knife and hand lever, including a vertically-movable link pivoted to said knife, and means for adjusting the relative positions of said knife and clamp to aline the knife with the bill of an oyster in said clamp, substantially as set forth.

7. In oyster shucking apparatus, the combination of an oyster-holding clamp, a support, an anvil thereon, means for adjusting the relative positions of said clamp and anvil to position the bill of an oyster held in said clamp on said anvil, an opening knife arranged to move over said anvil at a constant angle thereto, and means for advancing said knife over said anvil with the vertical inclination of said knife under manual control, substantially as set forth.

8. In oyster shucking apparatus, the combination of a support having an anvil thereon, a hand lever pivoted to said support, a cutter carried by said lever to coact with said anvil in clipping the bill of an oyster, an opening knife adapted to slide over said anvil, and connections between said lever and knife for advancing said knife over said anvil after the operation of said cutter, substantially as set forth.

9. In oyster shucking apparatus, the combination of a support having an anvil thereon, a cutter adapted to coact with said anvil in clipping the bill of an oyster, an opening knife adapted to slide over said anvil, an actuator for successively operating said cutter and advancing said knife, and connections between said actuator and knife permitting the vertical inclination of the latter to be manually controlled, substantially as set forth.

10. In oyster shucking apparatus, the combination of a support having an anvil thereon, an actuating lever pivoted to said support, a cutter carried by said lever to coact with said anvil in clipping the bill of an oyster, a second lever pivoted to said support, a link connecting said levers, an opening knife adapted to slide over said anvil, and a link pivotally connecting said second lever and the rear portion of said knife, said levers, links and knife being mounted to move in parallel vertical planes, substantially as set forth.

11. In oyster shucking apparatus, the combination of a base plate, an oyster-holding clamp thereon, a traversing screw above said base plate, and having a pivotal connection therewith, adjacent said clamp, permitting oscillation of said screw in a horizontal plane, a carriage mounted on said screw, to swing over said base plate therewith and to be traversed along the same by rotation of said screw, and oyster opening devices on said carriage, substantially as set forth.

12. In oyster shucking apparatus, the combination of a clamp, a carriage adjustable toward and from the same, an anvil on said carriage, a cutting device adapted to coact with said anvil in clipping the bill of an oyster, an opening knife adapted to move over said anvil, and means for moving said knife to open the oyster, substantially as set forth.

13. In oyster shucking apparatus, an oyster-clamping device comprising a pair of vertically pivoted curved jaws having inwardly extending surfaces to receive the hinge end of the oyster and inwardly extending, upwardly and outwardly inclined, clamping surfaces positioned to contact the edges of the shell adjacent the bill end of the oyster, means for causing both jaws to swing inwardly or outwardly together, and means for holding said clamping surfaces in contact with the edges of the lower shell under pressure, substantially as set forth.

14. In oyster shucking apparatus, a clamping device comprising a pair of curved jaws, vertically pivoted adjacent their forward ends, having inwardly extending surfaces adjacent the pivots thereof, to support the hinge end of the oyster, inwardly extending surfaces above said first mentioned surfaces, said surfaces inclining upwardly and downwardly, respectively, toward the forward ends of the jaws, and said upper surfaces extending inwardly a less distance than the lower surfaces, and inwardly extending clamping surfaces at the rear ends of the jaws, said surfaces inclining upwardly and outwardly; and means for adjusting said clamping surfaces into contact with the opposite edges of the lower shell of an oyster, substantially as set forth.

This specification signed and witnessed this 9th day of October, 1916.

BRUCE V. EDWARDS.

Witnesses:
DYER SMITH,
I. McINTOSH.